(12) United States Patent
Cha

(10) Patent No.: US 6,207,023 B1
(45) Date of Patent: Mar. 27, 2001

(54) PROCESS FOR MICROWAVE AIR PURIFICATION

(76) Inventor: Chang Yul Cha, 3807 Reynolds St., Laramie, WY (US) 82072

( * ) Notice: Subject to any disclaimer, the term of this patent is extended or adjusted under 35 U.S.C. 154(b) by 0 days.

(21) Appl. No.: 09/249,966

(22) Filed: Feb. 12, 1999

(51) Int. Cl.[7] .................................................. B01D 53/00
(52) U.S. Cl. .............................. 204/157.3; 204/157.43; 204/158.2
(58) Field of Search ........................... 204/157.3, 157.43, 204/158.2; 96/223; 422/21; 219/678, 679

(56) References Cited

U.S. PATENT DOCUMENTS

| | | | |
|---|---|---|---|
| 4,144,189 | 3/1979 | Kirkbride | 252/414 |
| 4,968,403 | 11/1990 | Herbst et al. | 208/113 |
| 5,227,598 * | 7/1993 | Woodmansee et al. | 219/10.55 R |
| 5,268,343 | 12/1993 | Hopp et al. | 502/5 |
| 5,269,892 | 12/1993 | Cha | 204/157.3 |
| 5,367,147 * | 11/1994 | Kim et al. | 219/698 |

OTHER PUBLICATIONS

Kirk–Othmer, *Encyclopedia of Chemical Technology*, 3rd Ed., Supp. Vol., "Plasma Technology," 599–608, John Wiley, NY—no date available.

Kirk–Othmer, *Encyclopedia of Chemical Technology*, 3rd. Ed., vol. 15, "Microwave Technology," 494–522, John Wiley, NY—no date available.

* cited by examiner

*Primary Examiner*—Edna Wong
(74) *Attorney, Agent, or Firm*—John O. Mingle

(57) ABSTRACT

A process of air purification occurs in the presence of activated carbon or its equivalent by decomposing adsorbed hazardous materials, such as volatile organic compounds, on the carbon surface by radiofrequency energy in the microwave range at near ambient conditions of temperature and pressure. Further microwave oxidation to nonhazardous gases occurs in the presence of an oxidation catalyst.

20 Claims, 2 Drawing Sheets

PROCESS FOR MICROWAVE AIR PURIFICATION

BACKGROUND OF INVENTION

1. Field of Invention

The present invention relates to a process using radiofrequency microwave energy to purify an air stream containing hazardous materials, particularly organic vapors, using carbonaceous adsorption followed by sweep gas microwave desorption with subsequent environmental cleanup.

2. Background

Hazardous waste material often occurs which contains organic compounds that are easily volatilized under common conditions. These sometimes naturally pollute a gas stream, like air, and sometimes result in polluted solids, like soil. In all instances release is not allowed without conversion to environmentally clean gases.

Such organic compounds, often called just organics, cover a wide variety and often contain halogen atoms, particularly chlorine, which originated from various previously employed solvents. For instance, a contaminated soil area which over the years had various liquid discharges containing organics dumped on it was tested and a wide range of concentrations of hazardous compounds detected. These are treated as a group to convert them into environmentally releasable compounds of water and carbon dioxide; however, to perform this the halide compounds are separately treated. The most typical halogen atoms end up as gaseous halide acids so they are commonly scrubbed with alkali and removed.

Adsorption of organics occurs readily upon carbonaceous materials, such as activated carbon. Thus a contaminated air stream passed through a bed of activated carbon will substantially purify it. Saturation of the bed will eventually occur so removal of the adsorbed organics is performed to allow recycling of the activated carbon. This desorption is conventionally performed by heating the bed to volatilize the organics. For instance, conventionally steam is employed for this task.

The subject invention employs microwaves for this desorption since activated carbon is a very good absorber of such microwaves. Then the desorbed volatiles, which are not necessarily in the same chemical form as they were when adsorption occurred, are collected by a sweep gas which is then treated to purify it using microwaves before release.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwaves" is generally employed to represent "radiofrequency energies selected from the range of about 500 to 5000 MHz", since in a practical sense this total range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates. For instance, refer to Kirk-Othmer, *Encyclopedia of Chemical Technology*, 3rd Edition, Volume 15, pages 494–517, Microwave Technology.

Related U.S. microwave patents include:

| No. | Inventor | Year |
| --- | --- | --- |
| 4,144,189 | Kirkbride | 1979 |
| 4,968,403 | Herbst et al. | 1990 |
| 5,269,892 | Cha | 1993 |
| 5,268,343 | Hopp et al. | 1993 |

Referring to the above list, Kirkbride discloses regeneration of spent fluid cracking catalysts by heating with microwaves to a range of 700–900° F. to remove coke; however, preheating by conventional means is suggested before usage of microwaves. The subject invention operates with much lower temperatures by microwave catalysis not just microwave heating.

Herbst et al. discloses an improvement in the regeneration of cracking catalysts by selective use of microwave heating. High temperatures in the 650–750° C. range are employed. The subject invention employs microwave catalysis not just microwave heating.

Cha discloses char-gas oxide reactions, such as $NO_x$ decomposition, catalyzed by microwaves, but does not decompose general hazardous matter, like organics. Yet this shows that if any $NO_x$ was present, it is made environmentally safe.

Hopp et al. disclose a conventional reactivation process for activated charcoal catalyst used with the preparation of R-227 refrigerant by heating to the 450–900° C. range. No microwaves are employed. The subject invention operates with much lower temperatures by microwave catalysis.

SUMMARY OF INVENTION

The objectives of the present invention include overcoming the above-mentioned deficiencies in the prior art and providing a potentially economically viable process for the microwave cleanup of contaminated air. This process occurs in the presence of activated carbon or its equivalent by desorbing and decomposing adsorbed hazardous materials on the carbon surface by radiofrequency energy in the microwave range at near ambient conditions of temperature and pressure. A further oxidation to nonhazardous gases occurs in the presence of an oxidation catalyst also employing microwaves.

DETAILED DESCRIPTION OF INVENTION

Microwaves are a versatile form of energy that is applicable to enhance chemical reactions since the energy is locally applied by its largely vibrational absorption by nonpolar molecules and does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in electron vibrational modes. Consequently the microwave waveguide design for the microwave cavity is not usually critical. Carbonaceous material for use with the subject invention commonly comprises activated carbon, char, soot, pyrolytic carbon, carbon black, activated charcoal, and metal carbides. In many instances activated carbon is the preferred material to employ under ambient temperature and pressure conditions, although activated charcoal, if readily available, is likely more cost effective. However in gaseous systems, especially at higher temperatures, other carbonaceous materials such as metal carbides, especially silicon carbide, are convenient to utilize. Silicon carbide is conveniently utilized as a microwave absorbing substrate to enhance conventional catalytic processes.

The microwave excitation of the molecules of the carbonaceous material, often referred to as microwave catalysis, excites constituents, such as hazardous matter and contaminants including organics, which have been adsorbed on the internal pore surfaces of the carbonaceous material and produces a highly reactive condition. Further molecules from the carrier medium, such as a sweep gas, are in close proximity or within the surface boundary layer of the carbon surface through chemisorption, absorption, adsorption, or diffusion, and additional chemical reactions with these constituents may occur.

An equimolar mixture of toluene, o-xylene, and trichloroethylene was employed as a typical combination of volatile organic compounds (VOC).

The desorption process potentially produces a wide range of chemical compounds since the microwave excited carbon surface and possibly the sweep gas molecules react with various decomposition products from the adsorbed constituents. The required final step consists of the microwave enhanced oxidation of hydrocarbons into water and carbon dioxide to produce an environmentally acceptable discharge. Additionally if halogens, such as chlorine, are present in the VOC, then gaseous halide acids, the most common which is hydrogen chloride, will form and removal by sodium hydroxide scrubbing occurs.

Figure 1:
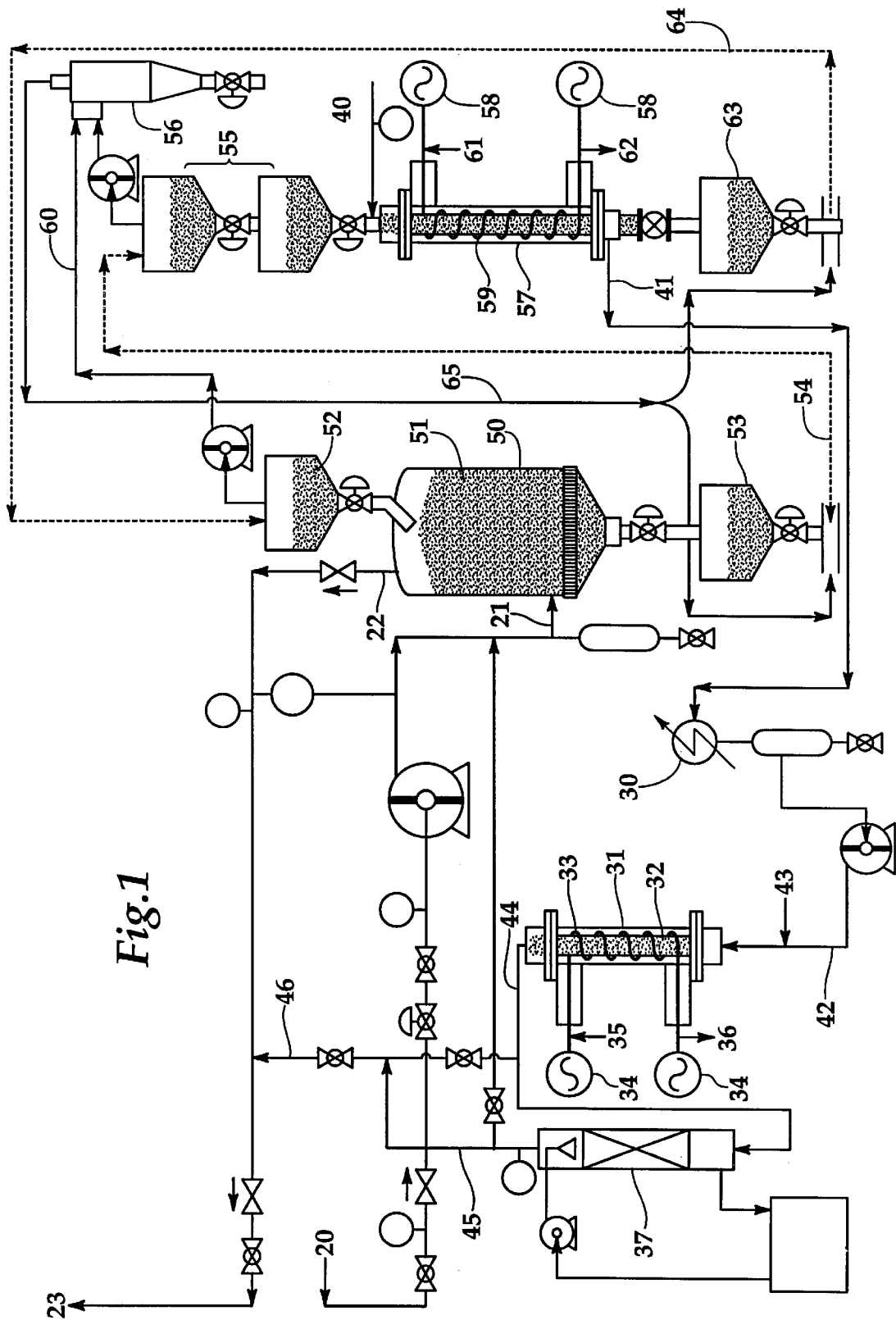
FIG. 1 shows a flow process for the removal of organics from a air stream and subsequent environmental cleanup.

FIG. 1 shows a process flow sheet for microwave air purification. All components are conventional except those utilizing microwaves. Contaminated air 20 enters and is pumped into the lower level 21 of a moving bed 50 of carbonaceous material 51 fed from a lock-hopper 52 of new or regenerated material and such material leaving into a receiving lock-hopper 53. The air leaves the carbonaceous material bed 50 at the top 22 as clean air and discharged 23. In an air purification process with a closed system such discharged air 23 is recycled. The saturated carbonaceous material is transported 54 into a lock-hopper system 55 which utilizes regeneration reactor off-gas 60 exhausted from the many lock-hoppers and cleaned with a cyclone 56 before use as a recirculation medium 65 to move the carbonaceous material around between various lock-hoppers. The saturated carbonaceous material is fed as a moving bed into the regeneration reactor 57 powered by a microwave system 58 utilizing a helix waveguide 59 and with cooling water in 61 and out 62. After leaving the regeneration reactor 57, the regenerated carbonaceous material is stored in a lock-hopper 63 and eventually recycled 64 back to the main adsorption reactor feed lock-hopper 52. The sweep gas 40 enters and passes down through the regeneration reactor 57 and leaves 41 and flows into a standard water condenser 30 to collect any condensed liquid and then flows 42 entering the oxidation reactor 31 where a stream 43 containing oxygen is mixed. The oxidation reactor 31 composed of a bed of oxidation catalysts 32 is powered by a microwave system 34 connected to an external microwave generator utilizing a helix waveguide 33 and with cooling water in 35 and out 36. These oxidation catalysts are deposited upon a substrate containing microwave absorbing carbonaceous material, often silicon carbide. The gas 44 leaving the oxidation reactor 31 is then tested for halide concentration, or alternatively the entering gas 20 is tested for halide atoms, and if halides are not present, this gas is mixed with the clean air 22 from the adsorption reactor 50 and discharged 23. If halides are present, the gas 44 passes through a conventional alkali scrubber system 37 which removes any halide acids and flows 45 before being mixed with the clean gas 22 from the adsorption reactor 50 and then discharged 23. It is to noted that the amount of flow 46 coming from the cleanup system is only a few percent of the principal flow system 22 coming from the adsorption reactor 50 so a large dilution factor occurs. The flow sheet shown in FIG. 1 contains many conventional accessories, like pumps, valves, pressure gages, filters, etc., which are necessary for safe operation of such a chemical process but are outside of the necessary components of the subject invention.

Figure 2:
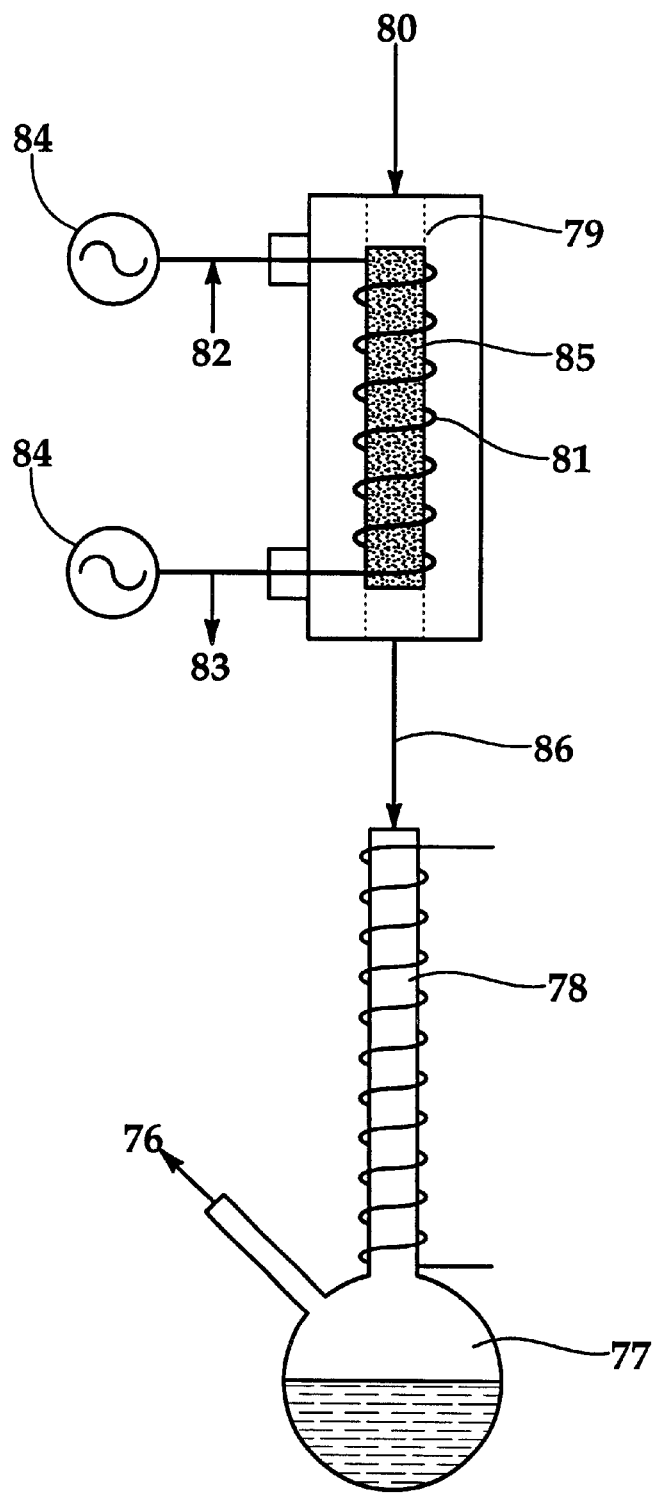
FIG. 2 shows an experimental apparatus for activated carbon regeneration.

FIG. 2 represents an experimental test apparatus to show the effective microwave regeneration of trichloroethylene saturated activated carbon. A quartz tube 79 is packed with activated carbon 85. Around the quartz tube 79 a helix 81 is wound as a microwave waveguide which is fed from microwave connectors 84 which are cooled by entering water 82 and leaving water 83 and are connected to an external microwave generator. Bleed gas enters 80 and leaves 86 into a conventional water condenser 78 which condenses liquid in the flask 77. The bleed gas then exits 76 the experimental apparatus. With the microwave system off, bleed gas containing trichloroethylene passes through the bed and is adsorbed until saturation of the activated carbon occurs. Then trichloroethylene free bleed gas is utilized using the microwave generator to regenerate the activated carbon.

EXAMPLE 1

To study the stability of carbonaceous material under continuing adsorption and desorption cycles, activated carbon was exposed to twenty such cycles. The apparatus of FIG. 2 was employed with a VOC of 200 ppm trichloroethylene. Nitrogen at 50 SCFH was the bleed gas. The microwave energy employed was 850 watts. By the fourth cycle the adsorption capacity had settled down into a substantially constant value appropriate to the accuracy of the measurements of 40 grams trichloroethylene per 100 grams of activated carbon. Thus recycling between many adsorption and desorption cycles does not substantially degrade the activated carbon bed.

EXAMPLE 2

The oxidation catalyst apparatus, as shown in FIG. 1, was utilized in an experimental setup to determine the efficiency of the oxidation step. Conventional platinum or palladium oxidation catalysts, such as PRO-VOC-7 manufactured by Protech Company, or equivalent, was utilized on an alumina substrate impregnated with approximately one-fourth by weight fine silicon carbon particles. The input air stream contained a solvent composed of an equimolar mixture of toluene, o-xylene, and trichloroethylene. The microwave power was 850 watts. With a six inch deep oxidation catalyst bed and a gas flow rate of 130 SCFH, solvent flow rates of from 30 to 70 mL/min produced substantially 100 percent destruction efficiency.

A process for microwave air purification with nonhazardous releases comprising adsorbing impurities, such as hazardous materials like organics, from said air with an unsaturated bed of carbonaceous material, being selected from the group consisting of activated carbon, char, soot, pyrolytic carbon, carbon black, activated charcoal, and metal carbides, until a substantially saturated bed occurs. A clean overhead gas is produced. To regenerate said substantially saturated bed of carbonaceous material so recycling of it occurs, microwaves are employed with a simultaneous sweep gas which removes desorbed vapors. Such sweep gas then passes through an oxidation catalyst bed also irradiated by microwaves, wherein said oxidation catalyst is deposited upon a microwave absorbing substrate impregnated with silicon carbide, and wherein sufficient oxygen is added to obtain substantially complete oxidation of the remaining vapors. The sweep gas further passes through an alkaline solution scrubber, such as sodium hydroxide, to remove any halide acids, such as hydrogen chloride. In the situation where halides are known to be absent, the scrubber step is omitted. Finally the non-hazardous, environmentally acceptable sweep gas is released.

The sweep gas is selected from the group consisting of nitrogen, helium, and carbon dioxide which represent environmentally neutral gases. The microwaves are radiofrequency energy selected from the frequency range consisting of 500 to 5000 Mhz. All beds, absorption, regeneration and catalyst, are selected from the group of beds consisting of fluidized, fixed, semi-fluidized, suspended, and moving.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for microwave purification of a gaseous stream with nonhazardous releases comprising:

adsorbing impurities from said gaseous stream with an unsaturated bed of carbonaceous material until a substantially saturated bed occurs while producing a clean release gas;

irradiating said substantially saturated bed with microwaves while a simultaneous sweep gas removes desorbed vapors;

passing said sweep gas through an oxidation catalyst bed irradiated by microwaves, wherein said oxidation catalyst is deposited upon a microwave absorbing substrate, and wherein sufficient oxygen is added to obtain substantially complete oxidation of remaining vapors;

passing said sweep gas through an alkaline solution scrubber to remove halide acids; and releasing the non-hazardous sweep gas.

2. The process according to claim 1 wherein said halide acids further comprise decomposition products from chlorinated organics.

3. The process according to claim 1 wherein said alkaline solution further comprises sodium hydroxide solution.

4. The process according to claim 1 wherein said halide acids further comprise hydrogen chloride.

5. The process according to claim 1 wherein said impurities further comprise hazardous matter.

6. The process according to claim 1 wherein said impurities further comprise volatile organic compounds.

7. The process according to claim 1 wherein said sweep gas further comprises environmentally acceptable gaseous compounds.

8. The process according to claim 1 wherein said sweep gas further comprises being selected from the group consisting of nitrogen, helium, and carbon dioxide.

9. The process according to claim 1 wherein said microwaves further comprise radiofrequency energy selected from the frequency range consisting of 500 to 5000 Mhz.

10. The process according to claim 1 wherein said carbonaceous material further comprises being selected from the group consisting of activated carbon, char, soot, pyrolytic carbon, carbon black, activated charcoal, and metal carbides.

11. The process according to claim 1 wherein said oxidation catalyst bed further comprises being selected from the group of beds consisting of fluidized, fixed, semi-fluidized, suspended, and moving.

12. The process according to claim 1 wherein said bed of carbonaceous material further comprises being selected from the group of beds consisting of fluidized, fixed, semi-fluidized, suspended, and moving.

13. The process according to claim 1 wherein said microwave absorbing substrate further comprises impregnation with metal carbides.

14. The process according to claim 1 wherein said releasing the non-hazardous sweep gas further comprises recycling said sweep gas.

15. A process for microwave air purification with environmentally acceptable releases comprising:

adsorbing impurities from said air with an unsaturated bed of activated carbon until a substantially saturated bed occurs while producing clean air;

irradiating said substantially saturated bed with microwaves while a simultaneous sweep gas removes desorbed vapors, where said sweep gas is selected from the group consisting of nitrogen, helium, and carbon dioxide;

passing said sweep gas through an oxidation catalyst bed irradiated by microwaves, wherein said oxidation catalyst is deposited upon a substrate impregnated with silicon carbide, and wherein sufficient oxygen is added to obtain substantially complete oxidation of remaining vapors;

passing said sweep gas through an alkaline solution scrubber to remove halide acids, and releasing the environmentally acceptable sweep gas.

16. The process according to claim 15 wherein all beds further comprise being selected from the group of beds consisting of fluidized, fixed, semi-fluidized, suspended, and moving.

17. The process according to claim 15 wherein said microwaves further comprise radiofrequency energy selected from the frequency range consisting of 500 to 5000 Mhz.

18. A process for microwave halide-free air purification with environmentally acceptable releases comprising:

adsorbing impurities from said air with an unsaturated bed of activated carbon until a substantially saturated bed occurs while producing clean air;

irradiating said substantially saturated bed with microwaves while a simultaneous sweep gas removes desorbed vapors, where said sweep gas is selected from the group consisting of nitrogen, helium, and carbon dioxide;

passing said sweep gas through an oxidation catalyst bed irradiated by microwaves, wherein said oxidation catalyst is deposited upon a substrate impregnated with silicon carbide, and wherein sufficient oxygen is added to obtain substantially complete oxidation of remaining vapors; and releasing the environmentally acceptable sweep gas.

19. The process according to claim 18 wherein all beds further comprise being selected from the group of beds consisting of fluidized, fixed, semi-fluidized, suspended, and moving.

20. The process according to claim 18 wherein said microwaves further comprise radiofrequency energy selected from the frequency range consisting of 500 to 5000 Mhz.

* * * * *